Figure 1:
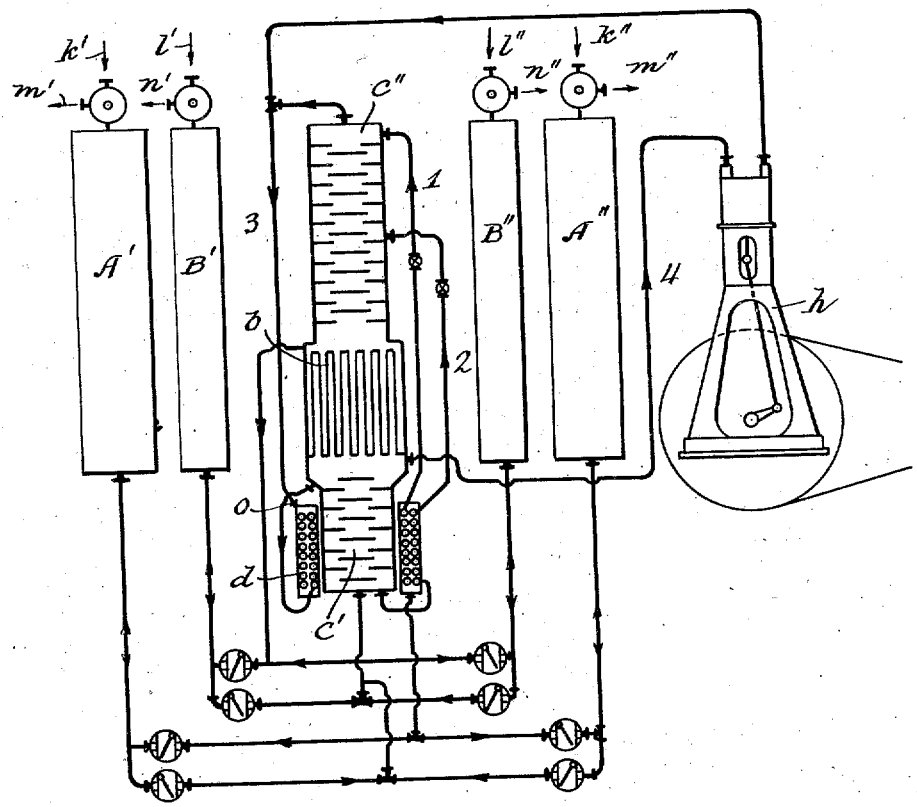

Aug. 14, 1934.   M. FRÄNKL   1,970,299
LOW PRESSURE PROCESS FOR SEPARATING LOW BOILING GAS MIXTURES
Filed March 19, 1930   2 Sheets-Sheet 1

INVENTOR
MATHIAS FRÄNKL
BY
ATTORNEYS

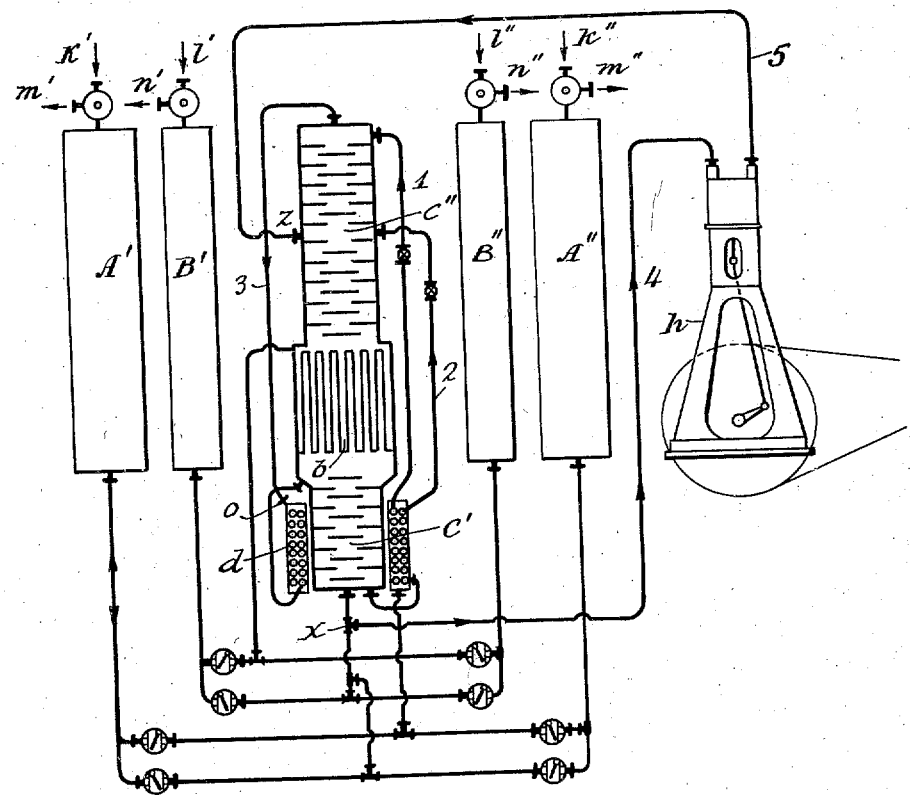

Patented Aug. 14, 1934

1,970,299

UNITED STATES PATENT OFFICE 1,970,299

LOW PRESSURE PROCESS FOR SEPARATING LOW BOILING GAS MIXTURES

Mathias Fränkl, Augsburg, Germany, assignor to American Oxythermic Corporation, New York, N. Y., a corporation of Delaware Application March 19, 1930, Serial No. 437,204
In Germany April 19, 1929

10 Claims. (Cl. 62—175.5)

This invention relates to a process for the separation of gas mixtures containing lower and higher boiling components and also other components, such as water and carbon dioxide which boil at still higher temperatures and which may be continuously operated in a simple and economical manner.

The separation of low boiling gas mixtures, for example air, into their main components as heretofore practiced is accompanied by a number of difficulties which have complicated and increased the cost of operation. One of the major difficulties arose from the fact that the moisture and the carbon dioxide, or other comparatively high boiling components, in the air or other gas mixture would precipitate as ice or snow in the tubular counter-current cold exchangers hitherto employed and thereby cause stopping up of the apparatus. The exchangers used in the known processes therefore had to be thawed out regularly after a shorter or longer operating period, even if the gas mixture had been previously either chemically or thermally treated. Secondly, the economy of existing processes is greatly reduced because in order to cover the cold losses, at least a portion of the air to be separated has to be compressed to a higher pressure than is required for the separation itself, so that a large expenditure of power in the compressor is necessary.

Furthermore, a loss of energy arises in that a considerable portion (up to about twenty per cent) of the washing liquid which has been liquefied at 3 to 4 atmospheres (i. e. above atmospheric), is again vaporized when the liquid is reduced to the lower pressure in the upper rectifier. Finally, all of the prior processes with the exception of that of Lachmann (German Patent No. 167,931) are based upon total liquefaction of the gas mixture to be separated which, as is known, requires a greater amount of power than partial liquefaction. The process of Lachmann has, however, the disadvantage that the removal of moisture and of carbon dioxide from the mixture to be separated is rendered very difficult because a rather large part of the mixture is separated at practically atmospheric pressure.

The present invention is an improvement over my copending application, Serial No. 81,723, filed January 16, 1926 which has now become Patent No. 1,890,646, in which a novel process and apparatus is disclosed for separating low boiling gas mixtures. A number of cold accumulators or regenerators of large cold-absorbing capacity are employed through which the warm incoming gas mixture and cold separated components are alternately passed with periodically reversed operation, so that, for example, currents of warm air are introduced through the same regenerators and through the same packing-filled spaces that the cold separated oxygen and nitrogen traversed during the previous operating period.

When a gas mixture containing what may be considered high boiling impurities, such as air which has not been previously treated to remove its moisture and carbon dioxide content, or from which these substances have been only partially removed, is conducted to the separating apparatus described in my above-mentioned application, these high boiling components (i. e. the water and carbon dioxide) will be deposited in the form of ice and frost in the regenerators. When such vapor and carbon dioxide-laden air, or similar gas mixture, is used, it is essential that the ice and frost deposited in the regenerators by the incoming gas mixture during any operating period be completely sublimed and carried off by the discharging separated components which pass through such regenerators during the following period when the flow of the gas mixture and separated components has been reversed. The regenerators otherwise will gradually become clogged with ice, and the operation of the apparatus will be disturbed and its continuity interrupted.

I have found that the accumulation of frost and ice in the cold regenerators or accumulators can be economically prevented without interruption of operation by so conducting the gas separation process that, among other things, a large volume differential exists between the incoming mixture and the discharging separated components. Thereby the complete removal of the deposited material by sublimation by the separated components as they leave the apparatus is insured. The use of the cold exchange system operating with periodic reversal and with sublimation of the solidified high boiling impurities is of particular economy when the gas mixture does not have to be compressed much above 4 atmospheres. The losses in compression energy otherwise become very noticeable because upon every reversal, e. g. about every three minutes, the volume of compressed air in the cold accumulators is lost and must be again replaced.

It is an object of the present invention to provide a method for the separation of gaseous mixtures employing the principle of cold regeneration with periodically reversed operation and in which the accumulation of precipitated high boiling impurities in the regenerators (accumulators) is prevented in a simple and economical manner. I accomplish such object by operating under a low pressure with partial liquefaction yet total compression of the gas mixture but without overcompression (i. e. above the condenser pressure required to effect the separation), in combination with a periodically reversed operation of cold accumulators which effects a transfer of the high boiling impurities, such as moisture and carbon dioxide, to the separated products, and in combination with an expansion of the available excess of low pressure gas with performance of work. Such a method of operation, furthermore, is advantageous because the losses of wash liquid due to evaporation during expansion from condenser pressure in a rectifier in which liquid is formed and preliminarily separated to a lower pressure in another rectifier of the separating apparatus are in large measure avoided.

The partial liquefaction of the gas mixture according to my process is apparently in contradiction to the total compression of the gas mixture, for the partial liquefaction should, it would seem, be based upon partial compression. I have found, however, that the removal by sublimation of the frost deposited by the water vapor and carbon dioxide content of the gas mixture necessary makes compresssiion of substantially all of the gas mixture in order to produce the required volume differential between the incoming mixture necessary and the discharging separated components. Accordingly, the removal of the frost has to be accomplished at the cost of the increased power expenditure involved in compressing substantially all of the gas mixture to condenser pressure.

This apparent sacrifice is, however, compensated for in my improved process by the fact that a portion of the excess of the compressed low pressure gas mixture, either before or after a preliminary separation with partial liquefaction (if after, then the lower boiling component which, in air, is the nitrogen) is diverted in the gaseous (or vaporous) state under pressure, and is expanded with performance of work in an expansion engine whereby the cold losses are covered. This quantity of gas is not needed for the formation of the required amount of wash liquid. The excess of compressed gas mixture, either as such mixture or as nitrogen separated by the preliminary separation, thus serves as the operating medium for an expansion engine in which it is expanded with the production of work and cold. It is also employed in the exhaust condition for cooling wash liquid before the latter is expanded and introduced into an upper rectifier of an upper or subsequent separating apparatus.

My improved low pressure process may, as indicated above, be so carried out that an excess of the compressed gas mixture may be expanded in an expansion engine without preliminary separation and may then, in the form of exhaust, be separated in an upper rectifier, that is by an after or subsequent separaton, so that it may then be conducted, likewise in the form of a lower boiling separated component (e. g. nitrogen), through the wash liquid cooler.

In practice the invention includes the following four steps: compression of substantially all of the gas mixture to a low pressure for the purpose of avoiding the accumulation of frost by subliming the latter with separated components in the cold regenerator through alternate periodical reversed operation; partial liquefaction of the mixture for the purpose of reducing the power requirement; expansion of the excess of the compressed gas mixture, in the form either of gas mixture or of lower boiling component, in an expansion engine; and cooling of the wash liquid with the exhaust of the expansion machine to prevent the evaporation of liquid (during the expansion from condenser pressure to the pressure of another or upper rectifier) in order to cover the cold losses. These steps stand in very close relationship, for only through marked difference between the average compression of the input air and that of the output components and operation with cold accumulators, which are alternately and periodically reversed, can the collection of ice and frost be avoided without extensive pre-treatment of the air or other mixture to be separated and without interruption of the process. Furthermore, only through partial liquefaction can the power requirement be considerably reduced and this is possible to a full extent and without loss of compressor energy only by a thorough cooling of the wash liquid, for that portion of the wash liquid which is vaporized during expansion to the pressure of the upper rectifier causes a useless expenditure of compression energy.

As is known, the continuous operation of gas separating plants requires an addition of cold in the form of liquid gas. According to the present process, the excess of compressor energy expended, when all of the gas mixture is compressed, over and above the amount of energy required for effecting partial liquefaction, is employed to produce additional cold in an expansion engine. This cold output is used to cool the wash liquid before it is expanded, so that in this way liquid for covering the cold losses is retained, and at the same time a loss of compressor energy by evaporation of wash liquid during expansion is avoided.

The employment of periodically reversed operation with cold accumulators or regenerators is interlinked with the low pressure compression of the gas mixture and with the subsequent cooling of the wash liquid. Without this cooling a loss of cold in the accumulators could not be avoided because the discharged lower boiling separated component always possesses a temperature which is ten to twenty degrees lower than that of the incoming compressed gas mixture. In the use of continuously operating tubular cold exchangers of any known type, there arises from such fact no disadvantage because the cold excess of the lower boiling component in the form of a lower temperature causes in such exchangers a partial liquefaction of the introduced gas mixture. This occurs indeed also in the cold accumulators, but in the latter the liquid cannot be drawn off, since it clings in the form of dew to the surfaces of the lower part of the accumulator packing when a compressed gas mixture is introduced into accumulators which were previously cooled by a lower boiling component which is cooler by ten to twenty degrees. The dew is, however, immediately evaporated when, upon reversed operation, the accumulator is again under no pressure and this cold if considerable liquefaction occurs in the regenerators is then carried out at the top and lost.

This loss of cold, when air is being separated, may be explained as follows: The air which has been compressed to about 4 atmospheres becomes liquid at a temperature of $-178°$ C.; the escaping separated nitrogen has, however, a temperature of $-196°$ C. and is thus about 18° colder, so that the cold accumulator through which at any moment nitrogen is being discharged is strongly super-cooled if the output phase is continued too long before reversal. When, upon reversal, compressed air of 4 atmospheres is introduced into the accumulator a small portion thereof becomes liquefied upon the super-cooled surfaces of the lower part of the accumulator packing, and clings to the latter in the form of dew. If, now, the accumulator is again reversed and nitrogen discharged therethrough, the dew immediately completely vaporizes because when under no pressure it can exist in the condensed condition only at —193° C. or below. Consequently this very considerable quantity of cold may be lost when the cold zone of the accumulator packing rises constantly higher and hence after some time the excess cold of the lower boiling component (nitrogen) escapes at the top. In order to avoid this loss, the lower boiling component, according to the present process, is first brought into cold exchange with the warmer wash liquid and warmed to approximately the liquefying temperature of the compressed gas mixture.

With my improved process air can be separated into its main constituents by simple compression to 3 to 4 atmospheres without any pre-treatment, and the apparatus required for carrying out the same includes in combination a low pressure compressor (for large plants, a turbo-compressor can be used), an expansion-piston engine or turbine, and two pairs of cold accumulators, in addition to the separator for effecting a preliminary separation, and a subsequent rectification. For obtaining commercially pure oxygen only one pair of cold regenerators is necessary and in place of the second a counter-current tubular exchanger may be used.

Heretofore a minimum pressure of 15 atmospheres was always necessary for the operation of such plants in order to provide both for the separation of the mixture and also for covering unavoidable cold losses; or else, a portion of the gas mixture to be separated had to be compressed to 50 to 60 atmospheres. Such pressures, however, are uneconomical for alternating reversed operation with cold accumulators. Former processes, furthermore, always required a special pre-treatment with chemicals, scrubbing with lye, or cooling, in order to prevent the collection of frost, and expensive multi-stage compressors had to be provided. Turbo-operation was heretofore not applicable because of the high pressure, when a separate plant for the production of additional liquid air was not to be erected, and likewise reversed operation with cold regenerators for effecting the cold exchange is excluded when the operation goes much above 4 atmospheres, because then the loss of compressed air upon reversal becomes too great.

Moreover, it has not been possible up to the present time, in spite of the complicated pre-treatment of the air mixture with chemicals, washing with lye, and cooling, to operate existing plants without interruption due to freezing. The apparatus for the pre-treatment, together with the expensive compressor plant, increased the cost of such plants so much that a general introduction of the separation of nitrogen from the air for the operation of iron mills never found favor, and adaptation to the chemical industry was prevented by the high operating costs, even disregarding the high power requirement, the great diversity of apparatus, the chemicals required, and the interruption of operation because of freezing. The latter also affect unfavorably the investment cost of the plant, as ordinarily reserve apparatus is provided.

In the accompanying drawings are illustrated by way of example two forms of apparatus for carrying out the present invention; in said drawings:

Figure 1 illustrates diagrammatically a plant embodying the present invention and employing part of the compressed nitrogen in the vapor state for operating the expansion engine; and Figure 2 is a similar diagrammatic view showing a plant in which part of the compressed air is used as such to operate the expansion engine.

The apparatus illustrated in Figure 1 includes cold regenerators $A'$, $A''$ and $B'$, $B''$, the evaporator-condenser $b$, the lower rectifier $c'$ operating at a pressure greater than atmospheric, the upper (after) rectifier $c''$ operating at substantially atmospheric pressure, the after or super-cooler $d$ for wash liquid and the expansion engine $h$.

About three-fourths to four-fifths of the air to be separated is conducted under pressure to the cold accumulator $A'$ through the reversing valve which it enters at $k'$. The air is cooled in such accumulator to —175° C. and is then for the greater part separated in the lower rectifier $c'$ into gaseous nitrogen and a liquid containing about 40% oxygen. The nitrogen then passes to the condenser side of the oxygen evaporator $b$ and from one-half to three-fourths thereof is liquefied, whereupon the liquid nitrogen is conducted by a conduit 1 to the head of the upper rectifier $c''$ while the liquid oxygen is introduced at the middle of said upper rectifier through a conduit 2. These liquids act as a wash liquid for the oxygen vapors rising from the evaporator side of evaporator-condenser $b$. From about one-fourth to one-half of the gaseous nitrogen, which is at a temperature of —175° C. is conducted to the expansion engine $h$ by a conduit 4; is expanded in the engine to 0.1 atmosphere, and in this way cooled to —196° C. A small portion of the nitrogen is liquefied under these conditions, so that a vapor containing about 5 per cent of liquid in the form of a mist is produced, which is then led by a conduit 3 to the cooler $d$, as indicated at $o$. The yield of cold that can thus be obtained amounts theoretically to 8 Cal., but practically about 5 Cal./kg. of air are obtained.

The exhaust nitrogen together with the separated nitrogen from the upper rectifier passes through the cooler $d$ for the wash liquid and there gives up sensible cold. It rises in temperature from —196° C. to —180° C. and thus cools the wash liquid, produced at a pressure of 3 atmospheres, from —178° C. to —190° C. Thereby partial evaporation thereof, when it is charged into the upper rectifier and the pressure thereon relieved, is prevented so that a larger amount remains, as liquid which serves to take care of the cold losses.

The nitrogen passes from the cooler through the cold regenerator $A''$ and escapes at $m''$ after giving up its cold to the packing in such regenerator. At intervals of a few minutes the reversing valves are operated in any suitable manner, as for example by a compressed air engine (not shown) and the direction of flow of the incoming air and the separated components through the regenerators is reversed. The compressed air then enters accumulator $A''$ at $k''$, and the nitrogen leaves the apparatus through the regenerator $A'$ and escapes at $m'$.

In this manner the compressed air entering through regenerators $A'$ and $A''$ always takes up the cold which was given up to them by the nitrogen passing therethrough in opposie direction during the previous reverse operating period. The oxygen, on the other hand, is alternately withdrawn through the accumulators B' and B" at $n'$ and $n''$. Through these regenerators one-fourth to one-fifth of the compressed air to be separated is alternately introduced at $l'$ and $l''$ in order to take up sensible cold deposited by the oxygen.

In order to obtain, for example, 250 cubic meters of oxygen of 75 per cent purity, one thousand cubic meters of air are compressed to 3 atmospheres, conducted through the regenerators and preliminarily separated into a liquid containing about 40 per cent oxygen and pure nitrogen in the lower (super-pressure) rectifier $c'$. From the rectifier $c'$, 300 cubic meters of nitrogen are conducted to the expansion engine and there expanded to 0.2 atmosphere. The exhaust nitrogen, together with the separated nitrogen discharged from the upper rectifier $c''$, is then conveyed to the cooler $d$. The cold yield from these 300 cubic meters of nitrogen obtainable from the work output of the expansion engine amounts to $360 \times 5 = 1800$ Cals. (since 300 cubic meters of nitrogen correspond to 360 kg. of air). This quantity of cold is delivered by the expansion engine not in the form of liquid air but as the sensible cold of the exhaust nitrogen.

The problem consists now in conserving the sensible cold of the exhaust into liquid. This is effected in that the liquid wash is cooled by the cold of the exhaust, together with that of the separated nitrogen from the upper rectifier, while the air for the operation of the expansion engine is separated into its main components by a pressure preliminary separation.

This separation of the air for the operation of the expansion engine can, however, also take place subsequently as exhaust. In such case the operating medium of such engine is not removed as nitrogen in the upper part of the pressure separator $c'$, but is withdrawn as compressed air from the conduit (Fig. 2) at point $x$ connected directly to the regenerators. The exhaust air is conducted to the upper rectifier $c''$, wherein it is separated. It is only subsequent to this separation that it is conveyed, as nitrogen and forming part of the total volume of separated nitrogen, through the cooler in order to cool the wash liquid.

The modification of my novel process in which the exhaust of the expansion engine is subsequently separated, is illustrated in Figure 2. The removal of the operating air for the expansion engine takes place at $x$ and the exhausted air is conveyed by conduit 5 into the upper rectifier $c''$ which it enters at $z$. This modified process has the disadvantage, as compared with that described in connection with Figure 1, in that the separation in the upper rectifier is increased by the amount of the exhaust air and the rectification is somewhat disturbed by the pulsating flow of the exhaust; also, because of the resistance in the rectifier, a higher exhaust pressure is opposed to the expansion engine. Furthermore, the use of nitrogen, which has been separated in the preliminary separation, has an advantage over air for operating the expansion engine because, whereas nitrogen can be cooled to $-196°$ C., air can be cooled to only $-191°$ C. This is particularly unfavorable in the present case because the wash liquid to be cooled already has a temperature of $-180°$ C., so that a temperature drop of only 11 degrees with air is available as against 16 degrees when nitrogen is employed to drive the expansion engine. As, however, a temperature difference of about 5 degrees always exists, then the effective temperature drop is only $11-5=6°$ for air as against $16-5=11°$ for nitrogen. Thus only slightly more than half as useful a yield can be obtained with air as with nitrogen operation. As these disadvantages are not accompanied by equal advantages, then in general, a preliminary separation of the air is to be carried out, especially as in the operation with non-separated air in the range of saturation a partial liquefaction of the oxygen occurs in the expansion engine, which greatly impairs the cold output of such engine.

The prevention of frost accumulation by sublimation is possible only with periodically reversed operation with cold accumulators. It is not possible with continuously operating cold exchangers. The operation of cold regenerators with periodical reversal presupposes that the separated components are discharged through the same space through which they are introduced into the apparatus in the form of the original mixture. This is not, however, the case with continuously operated cold exchangers since the inlet and outlet spaces of such apparatus are separated from each other by the heat-conducting walls or surfaces.

It will be clear from the above that, inasmuch as in my improved process air or other gas mixture is introduced under a compression of several atmospheres, while separated components are discharged under substantially no pressure, the volume of such escaping separated components is considerably larger than the volume of the incoming mixture. As the capacity of a gas for taking up vapors is a function of its volume and not of its weight, it will be evident that the moisture and carbon dioxide or other high boiling impurities deposited by the incoming mixture in the regenerator will be completely sublimed and carried off by the separated components passing through the regenerators upon reversal.

Accordingly, in the practice of the invention the high boiling impurities of a gas mixture are separated therefrom in cold regenerators and are removed therefrom by a subsequent flow in a reversed direction of separated components, thus making it unnecessary to subject gas mixtures such as air to expensive pre-treatments to remove the high boiling impurities therefrom.

Where in the claims I speak of expanding a portion of the mixture, this expression is to be understood to include not only unseparated gas mixture, but also a lower boiling component (such as nitrogen) obtained by a preliminary separation.

Variations may be resorted to within the scope of the appended claims without departing from the spirit of the invention. For example, it may not be necessary to employ both of the separated components, to sublime the precipitated frost and ice. This is particularly so in the case of air, wherein one component (nitrogen) preponderates over the other (oxygen). Thus the component present in smaller quantity need not be discharged through the regenerators, but may be conducted out of the apparatus through a recuperator or tubular exchanger. Thereby oxygen or other gas, of a higher degree of purity may be obtained since it does not become mixed with the air or gas remaining in the regenerator upon reversal; or the oxygen may be withdrawn in liquid form from the apparatus.

It is also to be understood that the following claims are intended to cover all of the generic and specific features of the invention herein described, and all statements of the scope of the invention which, as a matter of language, might be said to fall therebetween.

I claim:

1. The method of separating gas mixtures the entire amount of which is compressed to condenser pressure, which comprises charging a gas mixture into cold regenerators operating with periodical reversal, subjecting such mixture to a preliminary separation whereby lower and higher boiling components are produced and a portion thereof liquefied whereby a wash liquid is obtained, expanding separated lower boiling component in an expansion engine with performance of work whereby the temperature thereof is reduced, subjecting the mixture to an after-separation whereby a further separation into lower and higher boiling components takes place, and conducting lower boiling component in expanded condition from the expansion engine, together with lower boiling component discharged during the after-separation, in cold exchange relation with the wash liquid whereby an excess of wash liquid is obtained and losses of cold obviated.

2. The method of separating gas mixtures which comprises conducting a gas mixture the entire amount of which is compressed and which contains higher boiling vapors in contact with a chilled cold absorbing body to be precooled thereby with precipitation of higher boiling vapors, separating such precooled mixture into output components, and effecting substantially complete sublimation of the precipitated vapors by conducting separated output components in expanded condition in reverse direction in direct contact with a cold absorbing body upon which higher boiling vapors had previously been deposited.

3. The method of separating gas mixtures which comprises conducting a gas mixture the entire amount of which is compressed and which contains higher boiling vapors in contact with a chilled cold absorbing body to be precooled thereby with precipitation of higher boiling vapors, partially liquefying such mixture to produce a quantity of wash liquid, separating said mixture into higher and lower boiling output components, cooling said wash liquid with separated lower boiling output component, and effecting substantially complete sublimation of the precipitated vapors by conducting separated output components in expanded condition in reverse direction in direct contact with a cold absorbing body upon which higher boiling vapors had previously been deposited.

4. The method of separating gas mixtures which comprises conducting a gas mixture the entire amount of which is compressed and which contains higher boiling vapors in contact with a chilled cold absorbing body to be precooled thereby with precipitation of higher boiling vapors, partially liquefying such mixture, expanding an unliquefied portion of the mixture with performance of external work whereby the temperature thereof is reduced and cooling a part of the mixture therewith whereby cold losses are covered, separating said mixture into output components, and effecting substantially complete sublimation of the precipitated vapors by conducting separated output components in expanded condition in reverse direction in direct contact with a cold absorbing body upon which higher boiling vapors had previously been deposited.

5. The method of separating gas mixtures which comprises cooling a gas mixture the entire amount of which is compressed by direct contact with a cold regenerative body, liquefying a portion of such mixture whereby a wash liquid is obtained, expanding an unliquefied portion of the gas mixture with performance of external work whereby the temperature of such mixture is reduced, and cooling said wash liquid by conducting it in heat exchange relation with the expanded portion.

6. The method for the separation of gas mixtures containing higher boiling vapors which comprises conducting such a gas mixture through cold regenerators wherein the mixture is chilled and deposits higher boiling vapors, separating such mixture into output components, periodically reversing the flow through the regenerators, and effecting a substantially complete sublimation of the vapors deposited in the regenerators from the gas mixture during inflow by conducting separated output components through the regenerators in reverse direction of flow, the volume of each separated component at flowing conditions during reversal being sufficiently greater through each regenerator than the volume of inflowing gas passing through said regenerator during the previous period to effect sublimation of the deposited vapors.

7. The method of separating air containing moisture and carbon dioxide which comprises compressing air, chilling the same and depositing moisture and carbon dioxide therefrom by contacting with a cold, solid regenerative mass, separating the chilled air into nitrogen-enriched and oxygen-enriched output components, and substantially completely subliming the deposited moisture and carbon dioxide from a regenerative mass by conducting nitrogen-enriched output component in direct contact therewith in a direction reverse to that of the inflow of air, the volume of the nitrogen-enriched component being sufficiently greater than the volume of air previously contacted with said regenerative mass to effect substantially complete sublimation of the deposited vapors.

8. In a process for the separation of air, the method for the removal of higher boiling vapors such as moisture and carbon dioxide, which includes in combination, compressing air, depositing higher boiling vapors by condensation and solidification upon a solid thermal regenerative mass previously cooled to a temperature sufficiently low to effect said condensation and solidification by passing said air over and in direct contact with the chilled regenerative mass in regenerators, separating the thus chilled air into an oxygen-enriched and a nitrogen-enriched fraction, and simultaneously passing separately through other regenerators in contact with a similar thermal regenerative mass, the oxygen-enriched and nitrogen-enriched fractions at less compression and in sufficient volume to effect a substantially complete removal by sublimation of such higher boiling vapors deposited upon the regenerative masses, frequently and rapidly repeating phases which reverse as between said regenerators the direction of flow and the functions of said regenerators without substantially interrupting the use of said masses to thaw out said regenerators.

9. In a process for the separation of air, the method for the removal of higher boiling vapors such as moisture and carbon dioxide, which includes in combination, compressing air, depositing higher boiling vapors by condensation and solidification upon a solid thermal regenerative mass previously cooled to a temperature sufficiently low to effect said condensation and solidification by passing said air over and in direct contact with the chilled regenerative mass in regenerators, separating the thus chilled air into an oxygen-enriched and a nitrogen-enriched fraction, and simultaneously passing separately through other regenerators in contact with a similar thermal regenerative mass, the oxygen-enriched and nitrogen-enriched fractions at less compression and in sufficient volume to effect a substantially complete removal by sublimation of such higher boiling vapors deposited upon the regenerative mass, frequently and rapidly repeating phases which reverse as between said regenerators the direction of flow and the functions of said regenerators without substantially interrupting the use of said masses to thaw out said regenerators, the volume of the oxygen-enriched and the nitrogen-enriched fractions being greater than that of the input air previously chilled by the respective regenerative mass with which each fraction contacts.

10. In the method for the separation of gas mixtures by cooling, the step of removing impurities which condense at relatively high temperatures which comprises conducting said gas mixture the entire amount of which is subjected to compression through cold regenerators and at the same time conducting separated components through other cold regenerators in the opposite direction, and periodically reversing the flow through said regenerators, the volume of the component flowing in a direction opposite to the gas mixture being greater than that of the gas mixture which passed through the regenerator during a given previous period, whereby constituents of the gaseous mixture deposited in said regenerator are completely removed in a gaseous phase.

MATHIAS FRÄNKL.

CERTIFICATE OF CORRECTION.

Patent No. 1,970,299.    August 14, 1934.

MATHIAS FRANKL.

It is hereby certified that error appears in the printed specification of the above numbered patent requiring correction as follows: Page 2, lines 27 and 31, strike out the word "necessary"; and line 29, after "mixture" insert the word necessary; page 4, line 30, strike out the words "into liquid"; and that the said Letters Patent should be read with these corrections therein that the same may conform to the record of the case in the Patent Office.

Signed and sealed this 9th day of October, A. D. 1934.

(Seal)

Leslie Frazer
Acting Commissioner of Patents.

such as moisture and carbon dioxide, which includes in combination, compressing air, depositing higher boiling vapors by condensation and solidification upon a solid thermal regenerative mass previously cooled to a temperature sufficiently low to effect said condensation and solidification by passing said air over and in direct contact with the chilled regenerative mass in regenerators, separating the thus chilled air into an oxygen-enriched and a nitrogen-enriched fraction, and simultaneously passing separately through other regenerators in contact with a similar thermal regenerative mass, the oxygen-enriched and nitrogen-enriched fractions at less compression and in sufficient volume to effect a substantially complete removal by sublimation of such higher boiling vapors deposited upon the regenerative mass, frequently and rapidly repeating phases which reverse as between said regenerators the direction of flow and the functions of said regenerators without substantially interrupting the use of said masses to thaw out said regenerators, the volume of the oxygen-enriched and the nitrogen-enriched fractions being greater than that of the input air previously chilled by the respective regenerative mass with which each fraction contacts.

10. In the method for the separation of gas mixtures by cooling, the step of removing impurities which condense at relatively high temperatures which comprises conducting said gas mixture the entire amount of which is subjected to compression through cold regenerators and at the same time conducting separated components through other cold regenerators in the opposite direction, and periodically reversing the flow through said regenerators, the volume of the component flowing in a direction opposite to the gas mixture being greater than that of the gas mixture which passed through the regenerator during a given previous period, whereby constituents of the gaseous mixture deposited in said regenerator are completely removed in a gaseous phase.

MATHIAS FRÄNKL.

CERTIFICATE OF CORRECTION.

Patent No. 1,970,299.          August 14, 1934.

MATHIAS FRÄNKL.

It is hereby certified that error appears in the printed specification of the above numbered patent requiring correction as follows: Page 2, lines 27 and 31, strike out the word "necessary"; and line 29, after "mixture" insert the word necessary; page 4, line 30, strike out the words "into liquid"; and that the said Letters Patent should be read with these corrections therein that the same may conform to the record of the case in the Patent Office.

Signed and sealed this 9th day of October, A. D. 1934.

Leslie Frazer
Acting Commissioner of Patents.

(Seal)